United States Patent Office 3,351,703
Patented Nov. 7, 1967

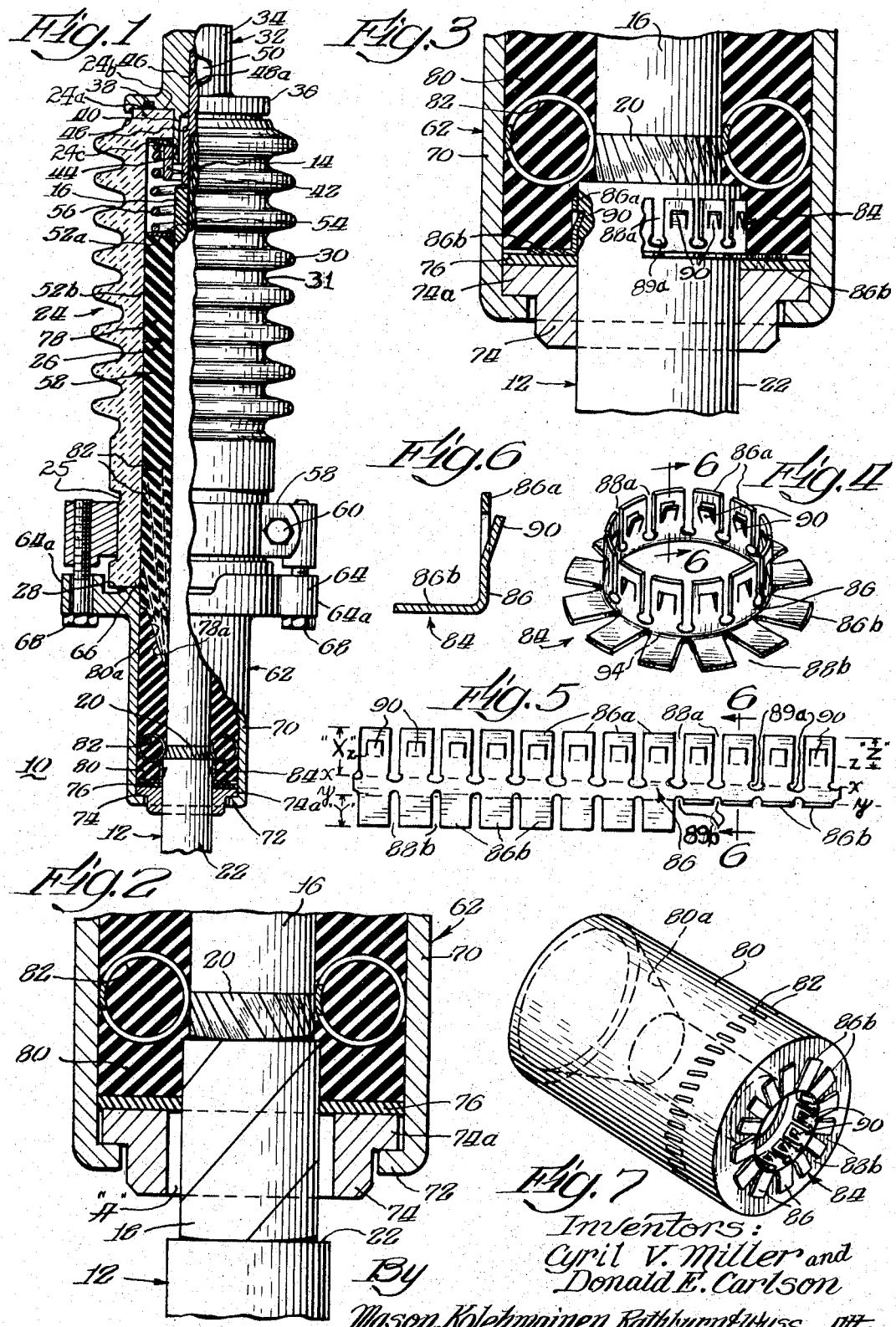

3,351,703
ELECTRICAL CABLE CONNECTOR WITH CABLE GRIPPING MEANS
Cyril V. Miller, Arlington Heights, and Donald E. Carlson, Highland Park, Ill., assignors to Joslyn Mfg. and Supply Co., Chicago, Ill., a corporation of Illinois
Filed Jan. 13, 1965, Ser. No. 425,263
2 Claims. (Cl. 174—75)

ABSTRACT OF THE DISCLOSURE

A connector for an electrical cable including an elongated rigid housing for receiving an end portion of the cable, and a tubular, elastic filler mounted on the end portion of the cable and inserted therewith into the housing. Force exerting means, such as a cup-shaped enclosure with an inwardly directed annular end flange, is provided for applying end thrust on the filler to force the filler tightly into the housing. Cable gripping means are provided for preventing longitudinal movement of the cable or jacket thereon away from the housing and the gripping means includes a tubular structure extending into the bore of the filler directly engaging the exterior surface cable and a flange radially outward of the cable disposed between the end of the filler and the flange on the force exerting means. The tubular gripping structure is formed with a plurality of deflectable segments and each segment has a tooth formed thereon adapted to bite into and tightly hold the cable when the tubular filler is inserted in the housing, thereby to positively restrain movement of the cable or jacket away from the housing.

---

The present invention relates to new and improved electrical terminal devices and, more particularly, to devices for terminating high voltage electrical cables having outer protective jackets formed of plastic material, such as polyethylene, which jackets are sometimes subject to longitudinal shrinkage.

The present invention is an improvement in cable terminating devices of the type illustrated and described in U.S. Patent 3,290,428 issued Dec. 6, 1966, on an original application filed Oct. 3, 1961, which patent is assigned to the same assignee as the present invention. Devices of this type are utilized for terminating high voltage electrical cables of the type having a central conductor surrounded by an insulating cover and a concentric outer grounding sheath surrounding the insulating cover. In some instances, the outer grounding sheath is in the form of a lead jacket and in other instances the sheath is comprised of a plurality of spirally wound or longitudinally extending individual conducting wires or, sometimes, a conducting metallic tape. In the latter two instances, the cable generally includes an outer protective jacket of plastic material, such as polyethylene or the like, which is used to cover and protect the tape or wires and to provide a smooth outer surface for the cable.

The terminal devices generally include a rigid insulating housing of porcelain or the like having an electrical terminal block at the upper end and an enlarged cavity opening at the lower end. A tubular dielectric elastic filler is slipped over a portion of the terminal end of the cable which has been properly prepared and the filler and cable are then inserted into the cavity. A conductive end fitting is used to enclose the lower portion of the filler and an end force is applied against the filler by the end fitting and by a spring mounted within the cavity to urge the filler into air-free interfacial engagement with the walls of the cavity and with the cable after assembly and compression of the filler and cable within the cavity. The central conductor of the cable is secured to the terminal block at the upper end of the housing and the compressive forces applied on the filler by the spring and end fitting aid in securing the terminal end of the cable tightly within the cavity and reduce any strain on the cable resulting from forces of contraction and expansion caused by ambient temperature changes around the cable and the terminal device.

One of the problems occurring with devices of the type described, when utilized with cables having outer protective jackets, is that the jackets are not positively secured to the terminal and sometimes the end of the jacket may pull out because of shrinkage or contractive forces and, consequently, a short portion of the shielding tape or wires may become exposed to the atmosphere and, hence, may deteriorate or corrode.

Accordingly, it is an object of the present invention to provide a new and improved electrical terminating device which prevents the aforementioned difficulty from occurring.

Another object of the present invention is the provision of a new and improved cable terminal apparatus having means provided internally thereof for positively preventing the withdrawal or pulling out of the cable jacket from the terminal enclosure.

Yet another object of the present invention is the provision of a new and improved cable terminal apparatus of the type described including new and improved means therein for restraining the protective jacket of the cable against forces tending to pull the jacket out of the end fitting of the apparatus.

Still another object of the present invention is the provision of a new and improved terminal apparatus for use in restraining and maintaining the jacket of a cable within an enclosure formed in the apparatus.

Yet another object of the present invention is the provision of a new and improved device for restraining a cable jacket within a terminal apparatus of the type described wherein the holding force on the cable jacket increases as the tension on the jacket tending to pull the jacket out of the terminal enclosure is increased.

A further object of the present invention is the provision of a new and improved cable jacket restraining device of the type described which can be constructed and prepared in the field for use with cables of different sizes and types.

The foregoing and other objects and advantages are accomplished in accordance with the present invention by providing a new and improved device for terminating electrical cables of the type which include an outer concentric protective jacket. The device includes a rigid insulating housing having an enlarged cavity at the lower end thereof for receiving a terminal end portion of the cable and a tubular dielectric elastic filler fitted around the cable and inserted therewith into the cavity. An end fitting encloses the lower end of the filler and the fititng, in cooperation with a spring assembly in the upper end of the cavity, provides end forces on the filler which cause the filler to be pressed into substantially air-free interfacial engagement with the walls of the cavity and the cable. Cable retaining means is disposed within the end fitting to closely encircle the cable and engage the outer jacket thereof in a manner to prevent the end of the cable jacket from being withdrawn or pulled out of the end fitting. The retaining means includes an outwardly extending annular flange structure which transfers pulling forces on the cable jacket to the end fitting. The retaining means also includes a band encircling the cable jacket having teeth thereon which bite into the cable jacket as the filler is compressed to secure the end of the jacket within the end fitting and prevent it from pulling out.

The invention, both as to its organization and manner of operation, will best be understood by reference to the following detailed description taken in conjunction with the accompanying drawings, wherein:

FIG. 1 is an elevational view with portions broken away and in section showing an electrical terminal device characterized by the features of the present invention;

FIG. 2 is an enlarged, fragmentary sectional elevational view showing the lower portion of an electrical terminal device generally similar to the device of FIG. 1 but without the cable jacket retaining means of the present invention and also illustrating the cable jacket in a condition wherein it has pulled out of the terminal housing;

FIG. 3 is an enlarged fragmentary, sectional elevation similar to FIG. 2 showing the lower portion of the terminal device of FIG. 1 with cable jacket retaining means therein;

FIG. 4 is an enlarged perspective view of the new and improved cable retaining means of the present invention illustrated in a completed form ready for installation in the terminal;

FIG. 5 is an enlarged detailed view of the flat strip means utilized for making the cable jacket retaining means shown in FIG. 4;

FIG. 6 is a cross-sectional view taken substantially along the line 6—6 of FIG. 5; and FIG. 7 is a perspective view illustrating the cable jacket retaining means of FIG. 4 assembled on the lower end of a resilient filler prior to insertion of the assembly into the housing of the terminal device.

Referring now to the drawings, there is illustrated in FIG. 1 an electrical terminal device 10 constructed in accordance with the present invention which is of the general type disclosed and claimed in the aforementioned copending application. The device 10 is used to terminate the end of a high-voltage electrical cable 12 of the type including a centrally disposed conductor 14 (FIG. 1) surrounded by a concentric insulating cover 16. The cable 12 is provided with an outer concentric conducting ground sheath 18 which surrounds the insulating cover 16. A layer of conductive bedding tape 20 is disposed between the sheath 18 and the outer surface of the cover 16 to insure that the outer surface of the insulating cover is maintained at ground potential and that a symmetrically uniform dielectric stress is maintained across the insulating cover 16.

An outer concentric protective jacket 22 is used to enclose the ground sheath 18 in order to protect the cable 12 and especially the sheath 18 from damage due to foreign objects and to prevent electrolytic action or corrosion between the sheath 18 and the surrounding media such as the earth in which the cable may be laid. The jacket 22 is generally constructed of a tough, strong, flexible and corrosion resistant material, such as polyethylene.

The device 10 includes an elongated housing 24 formed of a rigid insulating material, such as porcelain or the like, and the housing is formed to include an elongated cavity 26 opening at the lower end to receive the terminal end of the cable 12 and components associated therewith. The housing 24 includes an annular lower end face 28 encircling the lower end of the cavity and is formed with a plurality of alternately spaced ribs 30 and grooves 31 on its external surface. The upper end of the housing 24 has an inwardly extending annular end flange 24a forming an upper end surface 24b of the housing. The flange 24a has a lower annular surface 24c which defines an upper end wall of the cavity 26.

A terminal block 32 is mounted on the upper end of the housing 24 and is connected to the central conductor 14 of the cable 12. The terminal block includes means (not shown) for connecting the block to an external lead line (not shown) and is formed with an upstanding portion 34 and an enlarged cover flange 36 having a lower face abutting the upper end surface 24b of the housing. An annular O-ring gasket 38 is disposed within an annular recess formed in the lower face of the flange 36 and seats against the surface 24b to provide a seal preventing moisture or other material from entering the upper end of the housing. The upper end flange 24a defines a central aperture, so that a depending sleeve 40 formed on the terminal block can extend downwardly into the upper end of the cavity. The sleeve is externally threaded to receive a threaded collar or nut 42 for holding the terminal block 32 on the upper end of the housing 24. A Belleville lock washer 44 is interposed between the upper end of the collar 42 and the lower surface 24c of the end flange to prevent the collar 42 from inadvertently loosening after it has been tightened to secure the terminal block in position.

An axially aligned, upwardly extending central bore 46 is provided in the terminal block to receive the upper portion 48a of a compression connector fitting 48. The fitting is secured to the upper end of the central conductor 14 of the cable by press fitting in a manner well known in the art. A setscrew 50 is provided to secure the fitting 48 within the bore 46.

In order to increase the insulation around the terminal end of the cable within the housing and thereby reduce the potential stress gradient in this region, a tubular, elongated elastic filler 52 is slipped over an exposed length of the insulating cover 14 of the cable and inserted with the cable into the cavity 26. A spring assembly 56 is mounted in the upper end of the cavity 26 to exert a downward resilient force against the upper end 52a of the filler, and a bearing washer 54 is provided to uniformly distribute the resilient force of the spring assembly throughout the cross section of the filler. The spring assembly is more fully described in the copending application Ser. No. 403,211, filed Oct. 12, 1964, and the filler 52 is more fully described in the aforementioned U.S. Patent 3,290,428, briefly the filler includes a tapered outer peripheral surface 52b engaging the cylindrical wall of the cavity 26 along the major portion of its length and the internal bore of the filler is dimensioned to fit closely over the insulating cover 16 of the cable. As end force is applied to the filler, a pressure region is developed within the filler beginning at the portion of greatest diameter near the lower end of the cavity and, as the force is increased, a substantially air-free interfacial contact is established between the outer surface of the filler and the cylindrical wall of the cavity. As the end force is increased on the filler, the region of interfacial contact enlarges and moves progressively upwardly towards the upper end of the filler. Simultaneously, air-free interfacial engagement is established between the filler and the cable and this region of interfacial engagement also enlarges and moves progressively upward toward the upper end of the filler. As will be understood by reference to the U.S. Patent 3,290,428, the regions of interfacial engagement between the filler and cavity and between the filler and cable move progressively upward to exclude air pockets between the interfacing surfaces as the end force on the filter is increased. This phenomenon provides a means of uniformly and symmetrically increasing the insulation strength around the terminal end portion of the cable.

In order to mount the terminating device 10 and provide a ground connection therefor, the outer peripheral surface of the housing 24 is provided with an annular recess 25 adjacent the lower end thereof for seating, clamping, and mounting ring 58. The ring 58 includes a tightening screw 60 for tightly clamping the ring around the housing and also includes an outwardly extending mounting bracket (not shown) which is adapted for connection to a mounting panel or the like to support and provide a ground connection for the terminal device.

In order to apply end force on the filler to force the filler and cable into the cavity and to enclose the lower end of the filler, a cup-shaped end fitting 62 is mounted adjacent the lower end of the housing. The fitting is formed of conducting material, such as aluminum or the like, and has an annular flange 64 adjacent its upper end which faces the lower end of the clamping ring 58. An annular surface 66 is formed on the upper surface of the flange 64 to seat against the lower end surface 28 of the housing 24 when the end fitting is fully drawn upwardly into place. The flange 64 includes a plurality of radial lugs 64a having apertures therethrough for accommodating a plurality of upwardly extending cap screws 68 which are threaded into tapped openings in the ring 58. When screws 68 are tightened, the end fitting 62 is drawn upwardly to enclose the lower end of the housing and force the filler fully into the cavity against the spring assembly 56. The cap screws also electrically connect the end fitting to the ring. The end fitting is formed with a cylindrical sleeve portion 70 for enclosing the lower end of the filler 52 and is provided with an inturned end flange 72 which defines a central aperture to accommodate the cable 12.

A bushing member 74 is mounted in the lower end of the end fitting and is divided with an outwardly extending radial flange 74a adapted to bear against the inturned flange 72 of the end fitting. The bushing 74 is constructed of high strength insulating material, such as pressed fiber, in order to withstand the forces impressed thereon during insertion of the filler. A central bore is formed in the bushing having a diameter slightly larger than the outer diameter of the cable jacket 22 which extends therethrough. The bushings can be made with various diameter central bores in order to accommodate cables of different diameters. In order to seal the lower end of the end fitting around the cable, a washerlike sealing gasket 76 is provided to lie on the top surface of the bushing 74 to seal around the inner surface of the cylindrical sleeve 70.

The filler 52 can be formed of a single piece of dielectric or nonconducting tubular elastic material or, in the alternative, may be constructed in two pieces as illustrated in FIG. 1, wherein the filler includes an upper portion 78 formed of nonconducting material and a lower portion 80 of semiconducting or conducting material. The lower end of the dielectric portion 78 has a downwardly and inwardly tapering outer conical surface 78a adapted to seat against an upwardly and outwardly tapering conical surface 80a formed interiorly on the upper end of the conducting portion 80. When the two-piece filler is slipped onto the cable, the upper end of the bedding tape 20 is in contact with the conducting lower portion 80 of the filler so that the portion 80 is electrically connected to the cable sheath and maintained at the same electrical potential. The outer peripheral surface of the portion 80 of the filler is in contact with the internal wall of the end fitting completing the electrical connection between the cable and end fitting. Beginning at the lower end of the conical surface 80a of the filler, the dielectric stress within the cable insulation 16 is gradually and symmetrically reduced as the surface moves upwardly and outwardly away from the cable. This phenomenon is illustrated graphically by the upwardly and outwardly diverging lines 82 of equipotential stress shown in FIG. 1. Accordingly, the dielectric stress pattern which would normally be encountered at the point where an outer ground sheath is discontinuous with the rest of the cable is altered by the use of the conducting lower portion 80 of the filler and the possibility of arcing or corona discharge is eliminated or greatly reduced. A spring 82 is embedded in the lower conducting portion 80 of the filler with the inner edges on the loops of the spring lying in tangential contact either with the bedding tape 20 or the conducting sheath 18 of the cable and the outer edges of the loops contacting the end fitting 62. The spring is flexible so that as the lower end of the portion 80 of the filler is compressed by the end fitting 62 the spring can flex as necessary and still maintain good contact with both the bedding tape 20 or sheath 18 and the end fitting. The spring thus provides a low resistance path for any fault current carried or developed in the cable sheath 18 and also provides a direct path to ground so that the conducting lower portion 80 of the filler is not subjected to high current loads. Detailed construction and operating characteristics of the spring 82 and other embodiments thereof are disclosed and claimed in the copending U.S. application, Ser. No. 403,211, filed October 12, 1964, which application is assigned to the same assignee as the present invention, and reference should be had to this application for a better understanding of the spring and its functions.

Referring now, more specifically, to FIGS. 1 and 3 through 7 of the drawings, new and improved means are provided for restraining the end of the cable jacket 22 so that it will not shrink or pull out of the end fitting 62 after the terminal device is assembled. FIG. 2 illustrates a terminal device without such restraining means and shows the end of the cable jacket 22 completely removed or withdrawn from the end fitting, leaving a short portion of the sheath 18 exposed to the atmosphere where it may be injured or corroded. It is also apparent that withdrawal of the cable jacket 22 from the end fitting causes an annular space A to exist between the internal bore of the bushing 74 and the exposed surface of the sheath 18, which space could permit water and other impurities to enter the lower end of the end fitting to cause corrosion or undesirable electrolytic action between the sheath and the end fitting.

In order to eliminate the possibility of the cable jacket 22 pulling out of the end fitting 62, cable jacket retaining means 84 are provided within the end fitting to surround and engage the cable jacket.

The cable jacket retainer 84 is constructed from a piece of stamped, preformed strip material 86 (FIG. 5) cut to the proper length in the field to circumferentially encircle the cable jacket being used. The strip material 86 is stamped to include a plurality of spaced segments 86a and 86b along the upper and lower edges respectively, as shown in FIG. 5. The segments 86a are separated from one another by slotted out portions 88a, each having a relatively narrow throat portion and an enlarged head portion 89a at the bottom thereof. The enlarged head portions 89a are arranged to lie along a line $x$—$x$ which is parallel to and spaced a distance X from the upper edge of the strip 86. Because of the enlarged throat portions 89a of the slots 88a, each of the segments 88a will tend to flex or bend about the axis $x$—$x$ when a transverse force is applied to the segment.

The lower segments 86b are separated by a plurality of slotted portions 88b having roots 89b arranged to lie along a line $y$—$y$ parallel to and spaced a distance Y from the lower edge of the strip 86. Within each of the upper segments 88a a shear tooth 90 is stamped out so that the upper edges of the teeth protrude freely from the remaining portion or frame of the segments. The teeth 90 are positioned adjacent the upper portion of the segments and are deflected inwardly therefrom starting at points along a line $z$—$z$ which is parallel to the upper edge of the strip 86 and spaced a distance Z therefrom. It should be noted that the distance Z is approximately one-half the distance X indicating that the teeth 90 are positioned in the upper half of the segments 86a or thereabout. This is desirable because as force is applied to the frame portion of the segments 86a by the pressure of the filler thereon, the teeth 90 will dig or bite more deeply into the cable jacket than if the upper edges of the teeth were closer toward the root axis $x$—$x$ of the segments.

After the segments and teeth have been formed by stamping, the strip 86 is bent along the line $y$—$y$ to provide a cross section as shown in FIG. 6 which is similar to a conventional piece of angle. The strip 86 in angular cross section can then be cut in the field by the electrician to the proper length for the size of cable used and formed into the completed retainer as shown in FIG. 6.

Referring to FIG. 4 which illustrates the cable jacket retainer 84 in its completed form, the upwardly extending segments 86a form a collar encircling the cable jacket 22 and the lower segments 86b form an outwardly extending, radially segmented annular flange sandwiched between the gasket 76 and the lower end of the filler portion 80. The upper edges of the teeth 90 extend inwardly from their respective segments 86a in order to penetrate into and positively engage the outer surface of the cable jacket 22.

After the cable jacket retainer 84 has been formed in the manner described above, it is inserted into the lower end of the central bore in the filler portion 80, as shown in FIG. 7, with the segments 86b bearing against the lower end of the filler. The walls forming the central bore of the filler prevent the retainer from expanding and maintain the retainer within the filler, as shown.

In using the terminal device 10, the cable 12 is prepared by stripping back the outer protective jacket 22 a predetermined length from the terminal end of the cable. The cable ground sheath 18 is then stripped back from the end of the cable for a somewhat shorter length, leaving a portion exposed to contact the spring 82.

If the cable 12 is of the type including the bedding tape 20, the sheath 18 may be stripped back slightly farther, as illustrated in FIG. 1, and the bedding tape 20 will then be stripped back to leave a portion exposed for engagement with the spring 82. A short portion of the insulating cover 16 at the extreme end of the cable is stripped back as shown and the compression connector 48 is fitted onto the short length of exposed central conductor 14 by using a suitable compression tool.

After the cable has been prepared as outlined above, the end fitting 62 along with the gasket 76 and the bushing 74 are slipped over the end of the cable and moved downwardly onto the cable jacket 22. Next, the conducting filler portion 80 with the jacket retainer 84 positioned thereon (FIG. 7) is slipped onto the cable and moved downwardly until the upper ends of the teeth 90 of the jacket retainer 84 are below the stripped back end of the cable jacket 22. The teeth 90 are cammed outwardly during movement of the portion 80 onto the cable and, hence, do not interfere with the movement. The upper nonconducting filler portion 78 is then slipped over the end of the cable and moved toward the portion 80 until the conical lower end surface 78a contacts the matching conical surface 80a of the lower filler portion 80. These surfaces have previously been coated with silicon grease to insure air-free engagement between the two filler portions when the filler is compressed within the device.

The outer peripheral surfaces of both portions 78 and 80 of the filler are coated with silicone grease, and the upper bearing washer 54 is positioned in place. The terminal end of the cable and the parts assembled thereon, as described, are then inserted upwardly into the cavity 26 and the connector 48 is aligned with and inserted into the bore 46 of the terminal block 32. The end fitting 62 is then drawn upwardly by tightening the cap screws 68. As the end fitting is drawn upwardly the filler 52 is subjected to an end force which provides for the progressive air-free interfacial engagement between the cable and the filler and between the filler and the cavity in the housing and the end fitting. Since the filler 52 is formed of elastic material, it acts in a manner similar to a liquid under pressure and squeezes inwardly against the cable as well as outwardly against the end fitting 62 and the cavity as the end force is applied. The inward squeezing pressure on the lower portion 80 of the filler causes the segments 86a of jacket restrainer 84 to encircle the upper end of the cable jacket 22 very closely and as the end fitting is moved upwardly upon tightening the screws 68, the inwardly extending teeth 90 bite into and penetrate the cable jacket to hold the jacket securely within the end fitting and prevent it from being withdrawn or pulled out. The forces tending to cause the withdrawal of the cable jacket may result from shrinkage of the jacket because of changes in temperature or from other pulling forces applied to the jacket or to the cable itself. The use of the new and improved jacket restrainer 84 eliminates pullout of the jacket and also helps to relieve other stress on the cable components. As force is applied to the cable in a direction tending to pull the cable out of the terminal, the teeth 90 dig or bite into the jacket even more deeply to resist the applied forces. The forces thus applied to the retainer are transmitted by the radial segments 86b of the retainer to the end bushing 74 and flange 72 of the end fitting, and ultimately through the cap screws 68 to the clamping and mounting ring 58.

Since the cable restraining member 84 is easily constructed in the field to fit any size cable, the electrician can carry several pieces of prestamped and formed strips 86 which can be cut to desired lengths to fit any size cable without the necessity of carrying separate fittings for each of the different cable sizes used. Because of the cooperation between the retainer and the elastic filler, an increased pullout force on the cable results in increased holding power because of the biting action of the teeth 90 as described above. The teeth tend to hold the jacket more tightly as pull is increased on the cable since they slope inwardly and upwardly and, consequently, any downward movement of the cable causes the teeth to bite more deeply.

Since the segmented collar portion of the retainer 84 closely encircles the cable jacket, an efficient holding force is distributed around the entire periphery of the jacket. Moreover, the formation of the collar in spaced segments as opposed to a continuous band makes it much easier to remove the retainer from the cable when desired, since the segmented collar can be first slipped downward and rotated slightly on the cable so that the teeth and individual segments will not be aligned with indentations made previously by the teeth in the cable jacket and, after rotation, the retainer can easily be slipped upwardly off the cable with little effort.

The retainer 84 is completely contained within the end fitting 62 and does not protrude therefrom. Its operation is automatic and requires no tightening screws or unsightly external clamps which would be subject to corrosion.

Tests of the cable terminal of the invention have had excellent results. A cable having metal shielding tape immediately beneath a protective jacket of "Neoprene" was subjected to a load of 295 pounds before the jacket began to stretch out of the end fitting and the jacket immediately returned when this load was released. Another cable having a hard "polyethylene" jacket and spiral ground wires was subjected to a load of 400 pounds before the jacket pulled out of the end fitting, and again the jacket returned as soon as the load was released. In other cases the jacket itself tore off before pulling out of the end fitting, thus indicating the effectiveness of the retaining means.

Although the present invention has been described by reference to only a single embodiment thereof, it will be apparent that numerous other modifications and embodiments may be devised by those skilled in the art, and it is intended by the appended claims to cover all modifications and embodiments which will fall within the true spirit and scope of the present invention.

What is claimed as new and desired to be secured by Letters Patent of the United States is:

1. A connector device for an electrical cable including a rigid housing having an elongated cavity for receiving an end portion of said cable, an elongated, tubular, elastic filler around the end portion of said cable inserted into said cavity, a cup-shaped, force exerting means including an inwardly extending annular end flange for applying an end thrust on said filler to force and hold said filler under compression in said cavity, and cable gripping means for preventing longitudinal movement of said cable away from said cavity, said gripping means including a tubular structure extending into the bore of said filler engaging the exterior of said cable and a radial flange disposed between one end of said filler and said annular flange of said force exerting means, said tubular structure including a plurality of deflectable segments in a ring around said cable, each having a free outer end and an opposite end hingedly joined to an annulus adjacent the radial flange of said gripping means, the free ends of said segments being deflectable radially inwardly in gripping engagement against the exterior surface of said cable upon application of end thrust on said filler, and a sharpened tooth integrally formed on each of said segments, each tooth including a pointed outer end for biting engagement with said cable and a body portion extending angularly inward of said segment toward said cable whereby said tooth bites deeper into said cable upon attempted movement of said cable away from said cavity.

2. A connector device for an electrical cable of the type including a central conductor and an outer concentric protective jacket of resilient material, said device comprising a rigid housing having a terminal at one end connected to said central conductor and an elongated cavity open at the opposite end for receiving an end portion of the cable, a tubular elastic filler mounted on said cable and inserted therewith in said cavity, force exerting means enclosing an outer end of said filler and including a radially inwardly directed annular flange exerting an end thrust on said filler to force said filler into said cavity, gripping means engaging said cable jacket for preventing the movement of said jacket in a direction away from said cavity by forces opposed to the end thrust of said force exerting means, said gripping means including a tubular structure around said cable jacket extending into the bore of said filler and an annular radial flange extending outwardly from said cable for transmitting tension forces applied to said cable jacket to said force exerting means, said tubular structure including a plurality of deflectable segments in a ring around said cable, each having a free outer end and an opposite end hingedly joined to an annulus adjacent the radial flange of said gripping means, the free ends of said segments being deflectable radially inwardly in gripping engagement against the exterior surface of said cable upon application of end thrust on said filler, and a sharpened tooth integrally formed on each of said segments, each tooth including a pointed outer end for biting engagement with said cable and a body portion extending angularly inward of said segment toward said cable whereby said tooth bites deeper into said cable upon attempted movement of said cable away from said cavity.

References Cited

UNITED STATES PATENTS

| 1,098,775 | 6/1914 | Wheelock | 174—152 X |
| 2,142,768 | 1/1939 | Tompkins | 285—257 |
| 2,280,711 | 4/1942 | Machlett et al. | 174—75 |
| 3,219,751 | 11/1965 | Pfendler et al. | 174—88 |

FOREIGN PATENTS

| 88,791 | 4/1960 | Denmark. |
| 832,589 | 4/1960 | Great Britain. |

OTHER REFERENCES

Joslyn Advertisement, Electrical World, vol. 160 No. 21, Nov. 18, 1963, p. 107.

LARAMIE E. ASKIN, *Primary Examiner.*